June 6, 1933.  B. F. MIESSNER  1,912,991

ELECTRICAL SUPPLY SYSTEM

Filed May 3, 1929

WITNESS
Oliver W. Holmes

Inventor
BENJAMIN F. MIESSNER
By Attorney

Patented June 6, 1933

1,912,991

UNITED STATES PATENT OFFICE

BENJAMIN F. MIESSNER, OF SHORT HILLS, NEW JERSEY, ASSIGNOR, BY MESNE ASSIGNMENTS, TO RADIO CORPORATION OF AMERICA, OF NEW YORK, N. Y., A CORPORATION OF DELAWARE

ELECTRICAL SUPPLY SYSTEM

Application filed May 3, 1929. Serial No. 360,044.

My invention relates generally to electrical supply systems, and particularly systems involving pulsating unidirectional sources of supply for a work system requiring substantially steady current.

An object of my invention is to suppress the pulsations inherent in the current from the supply source before application to the work system.

A particular adaptation of my invention is the supply of energizing potentials for three electrode vacuum tubes in signal current amplifiers derived from rectifying the usual commercial alternating current, a feature of the invention being the suppression of the ripple in the rectified current to sufficient degree to avoid undesirable hum production in the amplifier system.

Figure 1:
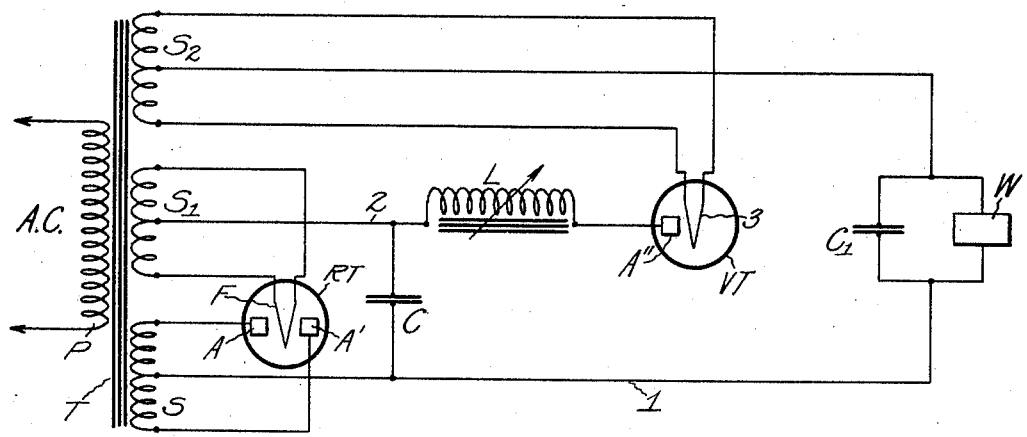
Figure 2:
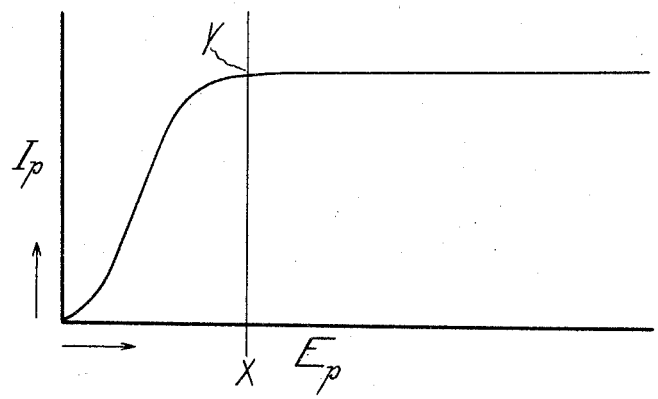

The substance of my invention is best understood by reference to the following description and the accompanying drawing in which:

Fig. 1 is a circuit diagram of my improved ripple or hum suppressing supply system, and Fig. 2 is a graph of the space current curve of the tube VT of Fig. 1.

Referring to Fig. 1, T designates a transformer, the primary P of which is energized from a source of alternating current A. C. The transformer T is provided with a plurality of filament heating secondaries $S_1$ and $S_2$ each provided with a central tap.

The secondary $S_1$ supplies heating current for the filament F of a full wave rectifier RT, the anodes A and A' of which are supplied with potential from the terminals of a high potential secondary S of the transformer T. The central top of the transformer S is connected by a lead 1 to a load system W, the plate circuits of three electrode vacuum tubes for example, the lead 1 forming the negative or low potential side of the system.

A lead 2 is connected to the central tap of the secondary $S_1$ and serves as the high or positive potential output of the rectifier tube RT. Between the leads 1 and 2 I have connected a filter and storage condenser C.

The lead 2 is connected to the anode A" of my improved ripple suppressing device which consists of a two element tube VT. This tube is provided with a cathode 3 preferably of the kind disclosed in U. S. Letters Patent 1,718,059, granted to me June 18, 1929, with the exception that for the present purpose the tube need not have a grid electrode. The tube described in this patent has a filamentary cathode of low emission temperature, low heating voltage, and high thermal inertia. These various features, if the filament is heated from a source of varying potential, say commercial A. C. supply, conspire to greatly reduce variations of the space current resulting from such A. C. operation. It will be later shown that the independency at a given plate voltage of the space current from alternating current fluctuations in the cathode is an important feature in the use of the tube for the purpose of this invention. Instead of a tube according to my patent specification mentioned before any other tube of substantially similar operating characteristics, may be used as, for example, a tube with indirectly heated cathode.

The cathode is heated by current supplied from the secondary $S_2$ of the transformer T, the midpoint of the secondary $S_2$ being directly connected to a terminal of load W. The load system W is preferably shunted by a filter and by-pass condenser $C_1$ as shown.

The tube VT is such that it has a plate potential-space current curve of the character shown in Fig. 2 in which the ordinates designate units of space current for corresponding potentials applied between the anode and cathode represented by abscissæ.

It is to be noted that a tube having a curve of the character shown has its conductive path substantially saturated at some point Y for a plate potential X. The position of this point X may be regarded as substantially fixed on the abscissa irrespective of reasonable fluctuations in the heating source of the cathode provided the cathode of the tube has the characteristics pointed out above. By operating the system so that the average output potential of rectifier RT exceeds the potential at the point X by sufficient amount that the minimum potential of fluctuation does not fall below the potential of the point X, the fluctuations at the load W will be materially decreased over the fluctuations of the source. It will be apparent now, why it is of importance that the cathode be of the type above mentioned. If, due to the energization of the cathode from a varying source of potential, the point X were allowed to execute oscillations in the abscissa of any substantial degree, saturation would become indefinite, unless the tube were operated at a plate potential in excess of that actually required, and, therefore desirable.

By altering the current through filament 3 to alter the emission therefrom permits of altering the characteristic curve of Fig. 2, so that a given structure of tube VT will permit of operation adjustment to adapt the tube for different desired output potentials of the rectifier RT. The filter condenser C and choke coil L aid in smoothing out the ripples and are preferably used if high order of smoothing out is desired.

While I have shown and described my invention as embodied in a specific structure, it is to be understood that I intend thereby no limitations. Other specific embodiments of my invention may be made within the scope thereof as defined by the claims appended hereto.

Having thus described my invention what I claim is:—

1. In an electrical current supply system the combination of a source of pulsating unidirectional current, a work circuit and an electronically conductive device in series between said source and system, said device having a cathode energized from a fluctuating source of current, said cathode being constructed so as to have low emission temperature, low heating voltage and high thermal inertia characteristics, said device being so energized that the average potential across the electronically conductive path exceeds the saturation potential of said path by at least the amplitude of the potential variations thereacross.

2. In an electrical current supply system, the combination of a source of fluctuating unidirectional current, a work system and means for isolating the fluctuating component of said source from said work system, said means consisting of a two element tube having a filamentary cathode energized from a varying source of potential and a plate voltage plate current curve including an origin of plate current saturation which origin remains approximately fixed for said varying-potential energization of the cathode and means for energizing said filament so that said origin of plate-current saturation has a value less than the normal current and voltage of said work circuit.

3. In an electrical current supply system, the combination of a source of fluctuating unidirectional current, a work circuit having a normal wattage consumption of a value less than the output of said source, a two element tube having a cathode of low emission temperature and high thermal inertia characteristics heated from a source of varying potential of a frequency equal to or less than the frequency of said source which tube is series connected between said source and said work circuit and means for energizing the filament of said tube from a varying potential source of aforesaid character so that the origin of wattage of space current saturation of said tube has a fixed value less than the normal wattage consumption of said work circuit.

4. In an electrical current supply system, the combination of a source of fluctuating unidirectional current, a work circuit connected for energization from said source, a two element electron tube having a cathode of low emission temperature and high thermal inertia characteristics heated from a source of varying potential of a frequency equal to or less than the frequency of said source which tube is series connected between said source and said work circuit and means for energizing said tube from a varying potential source of aforesaid character so that said tube approaches an impedance of constant and infinite value to the fluctuating component of said source.

5. In an electrical current supply system, the combination of a source of fluctuating unidirectional current, a work circuit connected for energization by said source, a two element electron tube having a cathode of low emission temperature and high thermal inertia characteristics heated from a source of varying potential of a frequency equal to or less than the frequency of said source which tube is series connected between said source and said work circuit and means for heating the filament of said tube from a varying potential source of aforesaid character to a temperature at which the tube is operating adjacent to and above the origin of saturation on its plate - current - plate - voltage curve, whereby the fluctuating component of said source is isolated from said work circuit.

6. In an electrical current supply system the combination of a source of fluctuating uni-directional current, an impedance device shunted across said source, a source of alternating current and a work circuit, means for connecting said source of fluctuating unidirectional current to said work circuit comprising, a choke coil and the space path of an electronically conductive device in series, said device having an anode and a cathode, said cathode being constructed so as to have low emission temperature, low heating voltage and high thermal inertia characteristics, and means for coupling said cathode to said alternating current source whereby said cathode is energized.

7. In an electrical current supply system, a source of alternating current, a source of pulsating uni-directional current, a space discharge device having an anode and a cathode spaced within an enclosure, means for coupling said cathode to said source of alternating current whereby said cathode is energized, a work circuit and means including a choke coil, the source of pulsating uni-directional current and the work circuit in series for connecting said anode to said cathode externally of said enclosure.

8. In an electrical current supply system a source of alternating current, a source of pulsating uni-directional current, a space discharge device having an anode and a cathode, said cathode being constructed so as to have low emission temperature, low heating voltage and high thermal inertia characteristics; means for energizing said cathode comprising said source of alternating current, a work circuit and a circuit including said source of uni-directional current and said work circuit in series for connecting said anode and said cathode.

9. In combination, a series circuit comprising a source of pulsating direct current, a work circuit and the space path of a space discharge device, said space discharge device having a cathode of low emission temperature, low heating voltage and high thermal inertia characteristics and an anode, a source of periodically varying current for energizing said cathode, a capacitive reactance shunted across said source of pulsating direct current and a capacitive reactance shunted across said work circuit.

10. In combintion, a series circuit comprising a source of pulsating direct current, a work circuit and the space path of a space discharge device, said space discharge device having a cathode of low emision temperature, low heating voltage and high thermal inertia characteristics, and an anode, a source of periodically varying current for energizing said cathode, said space discharge device being energized by said source of pulsating direct current and said source of periodically varying current in such a way that the average potential across the space path exceeds the saturation potential of said path by at least the amplitude of the potential variations thereacross caused by said source of pulsating direct current and a capacitive reactance shunted across said source of pulsating direct current.

In witness whereof, I have hereunto subscribed my name this first day of May, 1929.

BENJAMIN F. MIESSNER.